Oct. 8, 1935.   J. SNEED   2,016,875
VEHICLE BRAKE
Filed Nov. 18, 1927   3 Sheets-Sheet 1

Inventor
John Sneed

By Swan, Frye & Murray
Attorneys

Oct. 8, 1935.  J. SNEED  2,016,875
VEHICLE BRAKE
Filed Nov. 18, 1927    3 Sheets-Sheet 2
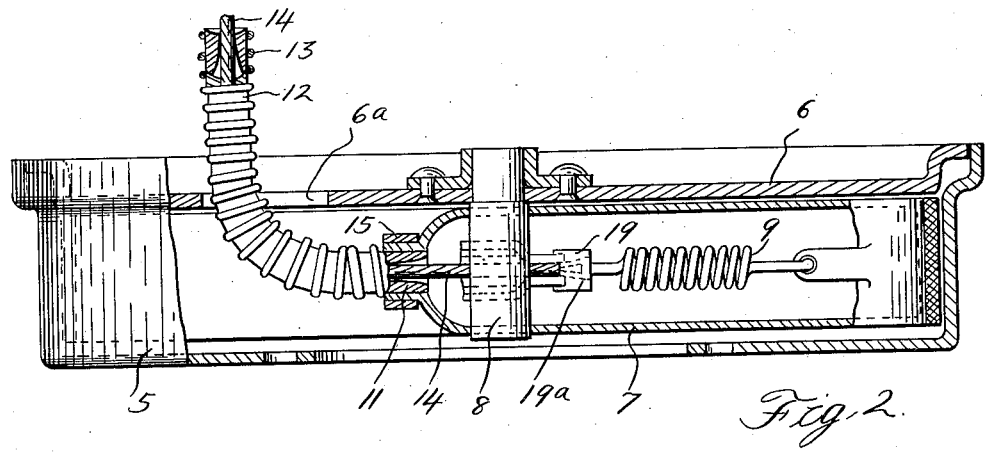
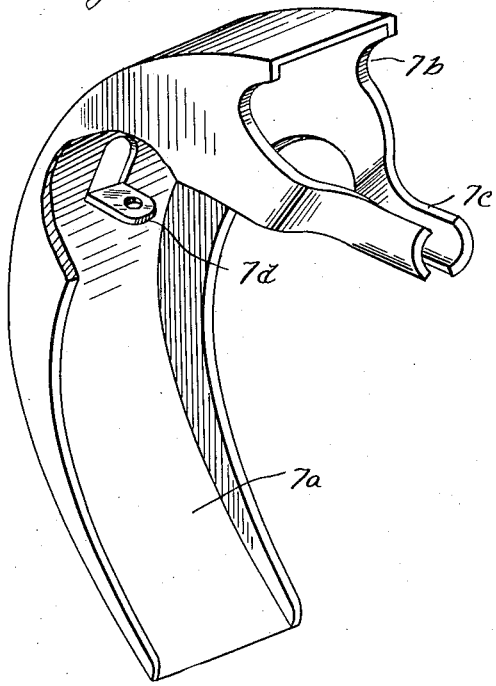
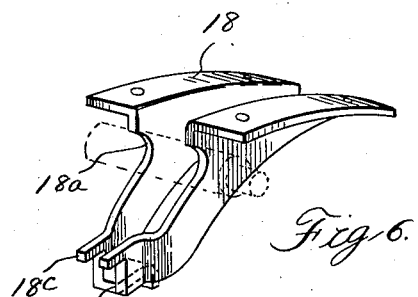
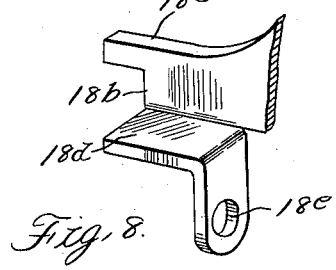
Inventor
John Sneed
By Swan, Frye & Murray
Attorneys Oct. 8, 1935.   J. SNEED   2,016,875
VEHICLE BRAKE
Filed Nov. 18, 1927   3 Sheets-Sheet 3

Inventor
John Sneed
By Swan, Frye & Murray
Attorneys

Patented Oct. 8, 1935

2,016,875

UNITED STATES PATENT OFFICE 2,016,875

VEHICLE BRAKE

John Sneed, Detroit, Mich., assignor to The Midland Steel Products Company, Cleveland, Ohio, a corporation of Ohio Application November 18, 1927, Serial No. 234,081

21 Claims. (Cl. 188—78)

This invention relates to vehicle brakes and more particularly to brakes adapted for use on two or four wheels of automobiles.

It has long been the practice in operating vehicle brakes to utilize a cam member or toggle levers arranged to engage the brake shoes and apply the brakes whenever the cam or toggle levers are properly moved. The primary object of my invention is the elimination of such cams or toggle levers contacting the brake shoe, whereby a simpler and more positive brake construction is provided with fewer moving parts.

A further object of my invention is the arrangement of a split annular brake shoe with its extremities normally engaging an anchor pin and having one extremity connected with a brake actuating cable and its opposite extremity connected with the flexible conduit housing a portion of such cable.

A further object of my invention is the provision of a housing for a brake shoe including a rotatable brake drum and a fixed apron arranged to substantially close the open side of the drum, the apron being provided with an aperture for the passage therethrough of a flexible conduit and a brake actuating cable connected to a brake shoe operatively arranged within the brake drum.

Other objects and advantages will be apparent from the following description, wherein reference is made to the accompanying drawings illustrating a preferred embodiment of my invention and wherein similar reference numerals designate similar parts throughout the several views.

In the drawings:

Figure 2 is a detail sectional view taken substantially on the line 2—2 of Figure 1.

Figure 1:
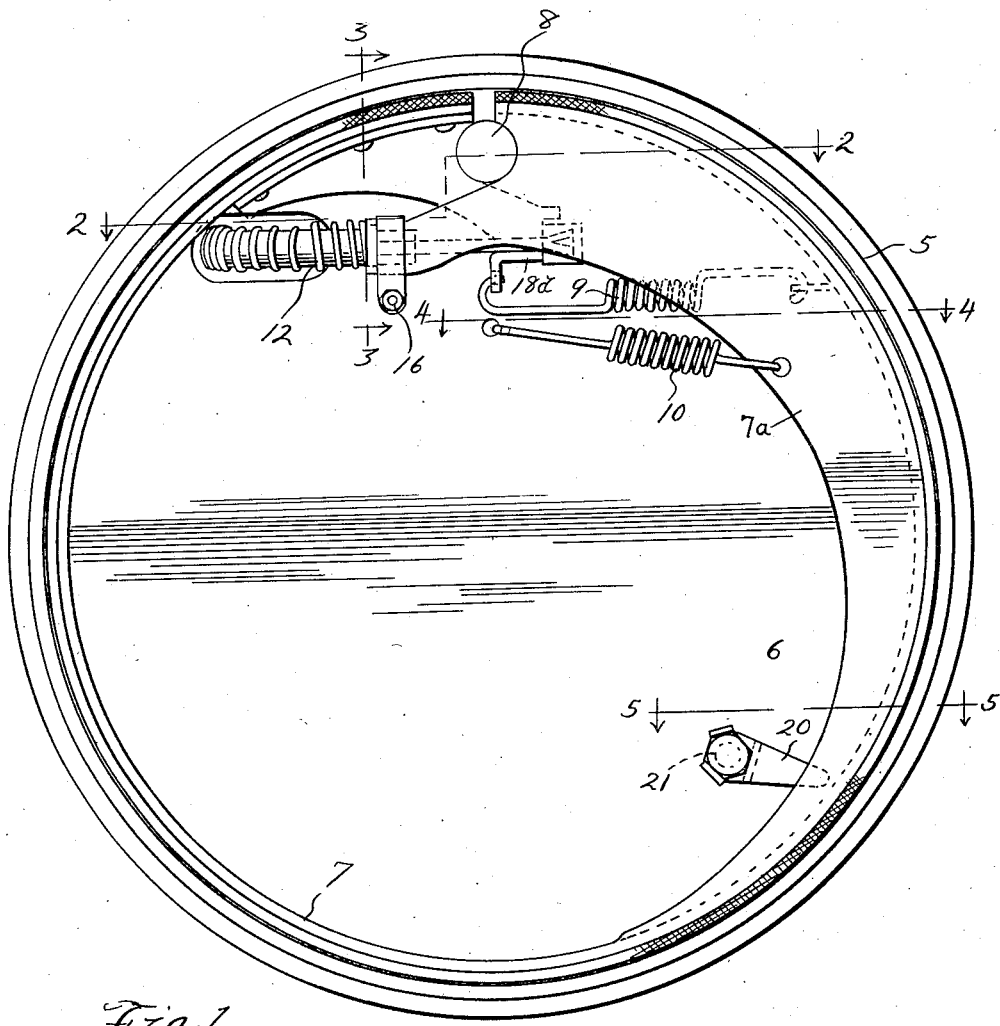
Figure 1 is a vertical sectional view through a vehicle brake constructed in accordance with my invention.
Figure 4:
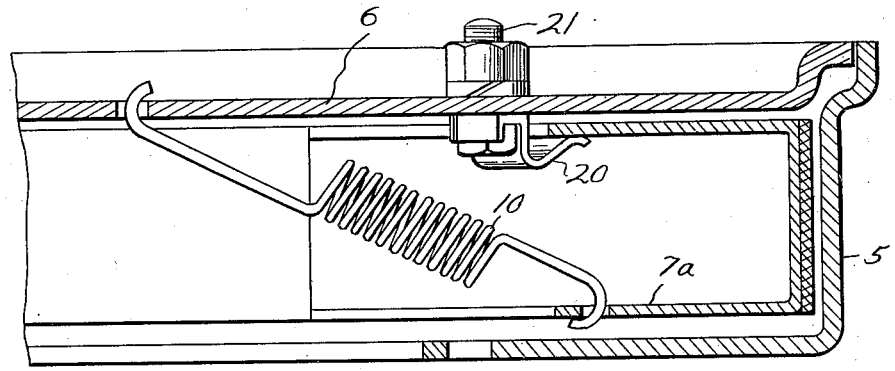
Figures 3, 5:
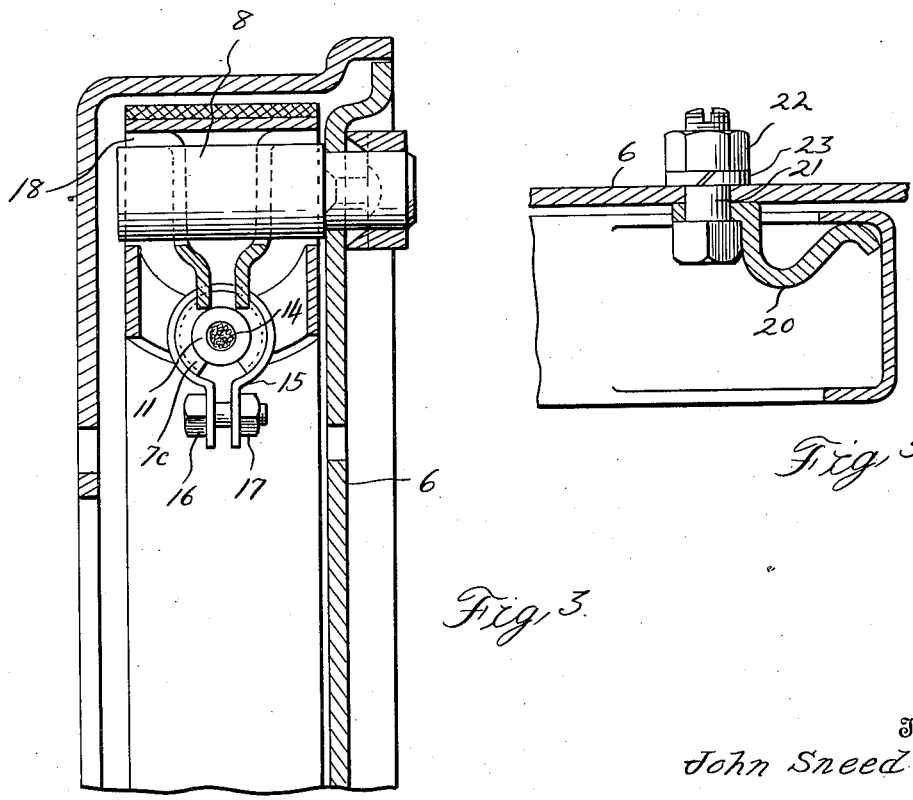
Figure 3 is a detail vertical section taken substantially on the line 3—3 of Figure 1.

Figures 4 and 5 are enlarged detail sections taken substantially on the lines 4—4 and 5—5 of Figure 1.

Figures 6 and 7 are detail perspective views, with parts broken away, showing the construction of the opposite extremity of the brake shoe, and Figure 8 is a detail perspective view showing the formation of the tip of the brake shoe extremity to which the flexible cable is adapted to be attached.

Referring now to the drawings, the numeral 5 designates a brake drum adapted to be secured to a wheel of an automobile or other vehicle in the usual or any desired manner so as to rotate with the wheel, and the numeral 6 designates an apron non-rotatably held upon a portion of the vehicle and arranged to substantially close the open side of the brake drum 5. Inasmuch as these parts may be of the usual or of any desired construction, and mounted in various ways upon the vehicle, no attempt has been made herein to illustrate a completely operative brake actuating mechanism, only so much of the vehicle parts being shown as is necessary to delineate the action of the brake mechanism forming the claimed disclosure hereof. Also while the illustrated embodiment portrays a brake drum adapted for use with an outwardly expanding brake shoe 7, it will be understood that my invention is also applicable to other types of brake shoes suitably arranged to co-act with a brake drum.

The brake shoe 7 is herein shown as comprising a one piece divided annulus having a substantially flexible portion and the remaining portion suitably stiffened so as to render it substantially rigid. The relative extents of the flexible and rigid portions may be varied as desired. The purpose of the flexible portion is to enable the gradual application of the brake shoe to the brake drum with increasing force, the movement of the brake actuating mechanism first forcing the adjacent extremity of the flexible portion of the brake shoe against the brake drum, after which the turning moment of the brake drum is utilized to multiply the gripping action of the flexible portion of the brake shoe and transmit increased power to the extremity of the rigid portion of the brake shoe opposite to the more flexible end engaged by the brake actuating mechanism. The result is that when the brakes are first set only a relatively small portion of the brake shoe surface is thrown into contact with the brake drum, and such braking surface is gradually increased by the rotation of the brake drum until the entire rigid portion of the brake shoe is moved as a unit into engagement with the brake shoe. The specific construction of this brake shoe is disclosed and claimed in my companion application, Serial No. 48,470, filed August 26, 1925, and is claimed herein in conjunction with the brake actuating mechanism hereinafter described.

The brake shoe 7 is herein shown as of the full floating type, with its opposite extremities normally contacting an anchor pin 8 fixed upon the apron 6 substantially as shown in Figures 1 and 2. A coil spring 9 is arranged between the opposite extremities of the brake shoe to normally urge the shoe extremities toward each other and into firm engagement with the anchor pin 8, while a second coil spring 10 is arranged between the rigid portion 7ª of the brake shoe and the apron 6, to provide an additional resistance to movement of the rigid extremity of the brake shoe away from the anchor pin. The extremity of the rigid portion 7ª of the brake shoe is preferably constructed substantially as shown in Figure 7, with a pair of substantially semi-circular seats 7ᵇ formed in its flanges to engage the anchor pin 8 at widely separated portions, and with a pair of arms 7ᶜ extending from the flanges of the brake shoe toward each other and curved at their tips, substantially as shown in Figure 7, to provide a seat for the outermost section 11 of a flexible conduit 12, substantially as shown in Figures 1 and 2. The flexible conduit 12 is preferably formed of a plurality of interfitting sections 11 surrounded by a coil spring 13 substantially as disclosed in my companion application, Serial No. 51,094, filed August 19, 1925; and its inner extremity is suitably secured upon an apertured bracket carried by the vehicle chassis. The flexible conduit 12 provides a guide for the longitudinal movement of the actuating cable 14, which is suitably connected at its inner extremity with the usual or any desired brake actuating lever mechanism mounted upon the vehicle chassis, and at its outer extremity with the extremity of the flexible portion of the brake shoe 7. To firmly secure the outermost section 11 of the flexible conduit upon the extremity of the rigid portion 7ª of the brake shoe, the outermost of the interfitting sections 11 is arranged between the spaced tips 7ᶜ of the brake shoe, which are clamped thereabout by means of a yoke 15, the free extremities of which may be moved toward or away from each other by means of the bolt 16 and nut 17 (note Figure 3).

The flexible portion of the brake shoe 7 carries at its extremity a shoe 18, preferably formed substantially as shown in Figure 6, with a pair of spaced flanges provided with substantially semi-circular seats 18ª for engagement with the anchor pin 8 between the arms 7ᶜ of the rigid extremity of the brake shoe. The tips of the flanges of the shoe 18 are brought comparatively close to each other and shaped to provide a ready securing means for the outer extremity of the cable 14. As herein shown the outer extremity of the cable 14 is wedged within the conical central aperture 19ª of a cap 19, the inner extremity of which cap is adapted to contact with the parallel faces 18ᵇ of the flanges of the shoe 18 (note Figures 2 and 6) and there held against upward vertical movement by the projections 18ᶜ on said flanges, and against downward vertical movement by the web portion 18ᵈ between the flanges. By virtue of this construction the flexible extremity of the brake shoe is firmly engaged by the cap 19 fixed upon the outermost extremity of the cable 14, which in turn is held against accidental movement relatively to the brake shoe. The web 18ᵈ is preferably bent downwardly substantially as shown in Figure 8 and provided with an aperture 18ᵉ to receive one extremity of the coil spring 9, while the rigid portion 7ª of the brake shoe may also be provided with an apertured tab 7ᵈ to receive the opposite extremity of the spring 9.

The operation of my improved brake shoe and actuating mechanism is believed to be apparent. Whenever the brake pedal or lever (not shown) is actuated, a pull is exerted upon the cable 14 of each brake so as to move the flexible extremity of the brake shoe 7 away from the anchor pin 8 and into engagement with the rotating brake drum 5. The rotation of the brake drum then tends to move the brake shoe with it in its rotation, but the rotation of the brake shoe is limited by the engagement of the rigid extremity of the brake shoe with the anchor pin, and so the rotation of the brake drum serves to move the flexible portion of the brake shoe further away from the rigid extremity thereof and in so doing increases the frictional resistance offered by the brake shoe. The continued rotation of the brake drum serves to bring the entire flexible portion of the brake shoe into engagement with the brake drum and then the movement is transmitted to the extremity of the rigid portion of the brake drum opposite that engaging the anchor pin, whereupon the entire rigid portion of the brake shoe is moved as a unit into engagement with the brake drum. It will be apparent that a gradually increasing braking effect is secured by this construction that will first slow up and then stop the rotation of the brake drum and the wheel attached thereto. When the brake pedal or lever is released the coil springs 9 and 10 serve to draw the brake shoe away from the brake drum and return it to its normal position. During the movements of the brake shoe the flexible conduit 12 remains fixed to the rigid extremity of the brake shoe and moves therewith during the slight tilting movement of the rigid portion of the brake shoe upon the anchor pin 8. The aperture 6ª in the apron 6 permits of this movement of the flexible conduit, and also permits the bending of the flexible conduit and cable during the up and down movements of the wheel relatively to the chassis, or the turning of front wheels of the vehicle during steering.

In the illustrated embodiment of the invention the brake shoe 7 is shown as a floating shoe with only its ends engaging the anchor pin 8. With this construction the spring 10 would tend to swing the lower portion of the brake shoe 7 on the anchor pin as a pivot until a portion of the brake shoe engaged the brake drum, and so would effect a drag upon the brake drum unless means were provided to limit such swinging movement of and center the brake shoe. As best shown in Figures 1 and 5 I have provided a stop member 20 in position to limit the swinging movement of the lower portion of the brake shoe under the force exerted by the spring 10. The member 20 is mounted upon the bolt 21 locked upon the apron 6 by means of the nut 22 and lock washer 23, with its free extremity spaced from the adjacent portion of the brake drum 5 a sufficient distance to permit the brake shoe to engage thereagainst before the diametrically opposed portion of the brake shoe contacts with the opposed portion of the brake drum. In other words, the member 20 holds the brake shoe in substantially centered position, stopping its swinging tendency under the influence of the spring 10 before the brake shoe can contact the brake drum and drag thereagainst. At the same time the member 20, in conjunction with the spring 10, provides a simple means for maintaining the desired clearance between the lower portion of the brake shoe and the brake drum. By swinging the stop member 20 on the bolt 21 the free extremity of the member may readily be positioned so as to stop the swinging tendency of the lower portion of the brake shoe at any desired position and so vary the clearance between the brake shoe and brake drum. It will further be noted, (Figure 5), that the member 20 also engages one flange of the rigid extremity 7ª of the brake shoe, and forms a stop limiting lateral movement of the brake shoe away from the apron due to vibration of the vehicle when driven over rough roads or the like.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:

1. The combination with brake actuating means including a cable, of a rotatable brake drum and a brake shoe member mounted within the brake drum and having overlapping extremities, one extremity of the shoe being connected to the cable and movable outwardly under the impulse thereof to cause contact between a portion of said shoe and the brake drum, the remainder of the effective portion of the brake shoe being movable into contact with said drum under the influence of frictional contact between said first mentioned portion and the drum.

2. The combination with brake actuating means including a cable, of a rotatable brake drum and a brake member formed as a divided annulus and mounted adjacent the drum, one extremity of the brake member overlapping the opposite extremity thereof and being directly connected to the cable, said extremity being movable thereby into contact with the brake drum, another portion of the brake member being arranged to exert sufficiently great yieldable resistance to movement into contact with the drum to prevent such contact being caused by such cable actuation.

3. The combination with brake actuating means including a cable, of a rotatable brake drum having an open side, an apertured apron arranged to substantially cover the open side of the drum, and a brake shoe formed as a divided annulus having overlapping extremities and arranged within the brake drum, the cable passing through the aperture in the apron and being directly connected with one extremity of the brake shoe, which extremity may thereby be moved into contact with the drum, another portion of the shoe being arranged to offer sufficiently great yieldable resistance to its movement into contact with the drum to prevent such contact being caused by actuation of the cable, contact thereof with the drum being causable by friction between the drum and that portion of the shoe forced into contact therewith by the cable.

4. The combination with brake actuating means including a cable and a flexible conduit housing a portion of the cable, of a rotatable brake drum having an open side, an apertured apron arranged to substantially cover the open side of the drum, an anchor pin carried by the apron, and a brake member arranged within the brake drum with adjacent extremities on opposite sides of and normally engaging the anchor pin, the cable and conduit passing through the aperture in said apron and being respectively connected to said extremities of the brake member.

5. The combination with brake actuating means including a cable and a flexible conduit housing a portion of the cable, of a rotatable brake drum having an open side, an apertured apron arranged to substantially cover the open side of the drum, an anchor pin carried by the apron, and a brake shoe formed as a divided annulus and arranged within the brake drum with its extremities normally engaging the anchor pin, the cable and conduit passing through the aperture in the apron and being respectively connected to the extremities of the brake shoe, whereby whenever a pull is exerted upon the cable one extremity of the brake shoe will be moved into contact with the brake drum.

6. The combination with brake actuating means including a cable and a flexible conduit housing a portion of the cable, of a rotatable brake drum having an open side, an apertured apron arranged to substantially cover the open side of the drum, an anchor pin carried by the apron, a brake shoe formed as a divided annulus and arranged within the brake drum with its extremities normally engaging the anchor pin, the cable and conduit passing through the aperture in the apron and being respectively connected to the extremities of the brake shoe, whereby whenever a pull is exerted upon the cable one extremity of the brake shoe will be moved into contact with the brake drum, and resilient means for normally maintaining the extremities of the brake shoe in engagement with the anchor pin.

7. The combination with brake actuating means including a cable and flexible conduit housing a portion of the cable, of a rotatable brake drum and a brake band arranged within the brake drum and carrying inwardly extending members adjacent its ends, arranged in overlapping relation, the cable being connected to one of said members and the conduit to the other.

8. The combination with brake actuating means including a cable and flexible conduit housing a portion of the cable, of a rotatable brake drum and a brake band arranged within the brake drum and carrying inwardly extending members adjacent its ends, arranged in overlapping relation, the cable extending through the overlapping portions of both of said members, and being connected to one of them and the conduit being connected to the other.

9. A brake having a brake drum and a friction device, an anchor disposed between adjacent ends of the friction device, extensions for said ends of said friction device extending across said anchor, and means engaging said extensions for moving the friction device into engagement with the brake drum.

10. A brake having a brake drum and a friction device, an anchor disposed between adjacent ends of the friction device, extensions for said ends of said friction device extending across said anchor, and means engaging said extensions for moving either of the ends of the friction device away from the anchor pin.

11. In combination with a drum, a brake shoe forming a channel section at one end and having radially extending side flanges, an anchor pin, portions of the flanges remote from the base of the channel extending beyond the pin, and means engaging the extensions for causing contact of said shoe with said drum.

12. In combination with a drum a brake shoe formed in channel section at one end and having a lining supporting part and radially extending side flanges, an anchor pin, bearing surfaces cut in the end of said flanges for engagement with said pin, portions of the flanges remote from the lining supporting part of the channel extending beyond the end of the lining supporting part, and means engaging said extensions for causing contact of said shoe with said drum.

13. In a brake, a brake drum, a brake shoe disposed within the drum, an anchor pin disposed between adjacent ends of said shoe, the said shoe being channeled in section at least at one end and having radially extending side flanges engaging said anchor and extending inwardly of and beyond said anchor, the other end of said shoe also extending inwardly of and beyond said anchor and overlapping the extension of the channel end of the shoe, and means for forcing said shoe into engagement with said drum.

14. A brake comprising a brake drum, a friction means disposed within the drum, an anchor disposed between adjacent ends of said friction means, an extension from one of said ends overlapping the anchor and the other of said ends, and a retractor spring connecting said overlapping extension to the body of said friction means for drawing said ends into engagement with the anchor.

15. The combination with a brake drum having an open side and a backing plate arranged to substantially close the open side of the brake drum, of an anchor member carried by the backing plate, a brake shoe arranged within the drum and having adjacent ends engaging the anchor member, extensions carried by the said ends of the brake shoe and overlapping the anchor member, means secured to the backing plate and brake shoe for normally holding one end of the brake shoe against the anchor member, and means engaging said extensions for forcing one end of the brake shoe away from the anchor member.

16. The combination with a brake drum having an open side and a backing plate arranged to substantially close the open side of the brake drum, of an anchor member carried by the backing plate, a brake shoe arranged within the drum and having adjacent ends engaging the anchor member, extensions carried by the said ends of the brake shoe and overlapping the anchor member, means secured to one of said extensions and the brake shoe for normally holding the ends of the brake shoe against the anchor member, and means engaging said extensions for forcing one end of the brake shoe away from the anchor member.

17. A brake shoe channeled in section at one end and having inwardly extending radial side flanges, said side flanges decreasing in depth away from the ends of said shoe toward the body of said shoe, and said side flanges also extending beyond the end of said shoe.

18. A brake comprising in combination, a drum, an anchor, friction means engageable with the drum and including relatively rigid and relatively flexible portions, the rigid portion of said friction means engaging the anchor at one end, an adjustable stop engaging the rigid portion at a point remote from the anchor, a spring connected to said rigid portion and urging said means against the stop, and means for moving said relatively flexible portion into engagement with the drum while the relatively rigid portion is held by said spring against the stop.

19. A brake comprising in combination, a drum, an anchor, friction means engageable with the drum and comprising a divided annulus having relatively rigid and relatively flexible portions, the rigid portion of said friction means engaging the anchor at one end, an adjustable stop engaging the rigid portion at a point remote from the anchor, a spring connected to said rigid portion and urging said means against the stop, and means for moving said relatively flexible portion into engagement with the drum while the relatively rigid portion is held by said spring against the stop.

20. The combination with brake actuation means including a cable, of a rotable brake drum having an open side, an apertured apron arranged to substantially cover the open side of the drum, and a brake shoe arranged within the brake drum and movable outwardly into contact therewith by the cable, the cable passing through the aperture in the apron and being directly connected to one extremity of the brake shoe, the brake shoe having a flexible portion between its cable-connected end and the remainder of the shoe, and yieldable means for preventing outward movement of the portion of the shoe farther from its cable-connected end, whereby only said cable-connected end of the shoe may be moved into engagement with the drum by means of said cable.

21. In a vehicle brake, a brake drum, a brake band arranged within the drum and formed as a divided annulus having overlapping end portions, and means secured to said end portion for moving one of said overlapping end portions toward the other to engage a portion of the brake band with the brake drum, said other end portion of the brake band remaining substantially fixed during such induced movement of the one end portion.

JOHN SNEED.